United States Patent
Shriraghav et al.

(10) Patent No.: US 7,251,646 B1
(45) Date of Patent: Jul. 31, 2007

(54) MINIMAL DIFFERENCE QUERY AND VIEW MATCHING

(75) Inventors: Kaushik Shriraghav, Bellevue, WA (US); Venkatesh Ganti, Bellevue, WA (US); Xin Dong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/352,628

(22) Filed: Feb. 13, 2006

(51) Int. Cl.
*G06F 17/30* (2006.01)
(52) U.S. Cl. .................................. 707/2; 707/3; 707/4
(58) Field of Classification Search ..................... None
See application file for complete search history.

(56) References Cited

U.S. PATENT DOCUMENTS

| | | | | |
|---|---|---|---|---|
| 5,768,578 | A * | 6/1998 | Kirk et al. ................... | 707/100 |
| 2004/0083204 | A1* | 4/2004 | Dettinger et al. .............. | 707/3 |
| 2005/0289100 | A1* | 12/2005 | Dettinger et al. .............. | 707/1 |
| 2006/0036580 | A1* | 2/2006 | Stata et al. .................... | 707/3 |

OTHER PUBLICATIONS

Afrati, F. et al., "Generating Efficient Plans for Queries Using Views," in Proceedings of ACM SIGMOD Conference 2001, Santa Barbara, California, May 21-24, 2001, pp. 319-330.
AHO, A. et al., "Equivalence of Relational Expressions," SIAM Journal of Computing, vol. 8, No. 2, May 1979, pp. 218-246.
Bello, R. et al., "Materialized Views in Oracle," in Proceedings of the 24th VLDB Conference, New York, New York, 1998, pp. 659-664.
Chandra, A. and Merlin, P., "Optimal Implementation of Conjunctive Queries in Relational Databases," in Proceedings of the Ninth Annual ACM Symposium on Theory of Computing (STOC), 1977, pp. 77-90.
Chaudhuri, S. et al., "Robust and Efficient Fuzzy Match for Online Data Cleaning," in Proceedings of ACM SIGMOD Conference 2003, San Diego, California, Jun. 9-12, 2003, pp. 313-324.
Chaudhuri, S. et al., "Optimizing Queries with Materialized Views," in Proceedings of the 11th International Conference on Data Engineering, Taipei, Taiwan, Mar. 6-10, 1995, pp. 190-200.
Cohen, W., "Integration of Heterogeneous Databases Without Common Domains Using Queries Based on Textual Similarity," in Proceedings of ACM SIGMOD Conference 1998, Seattle, Washington, Jun. 2-4, 1998, pp. 201-212.
Dar, S. et al., "Semantic Data Caching and Replacement," in Proceedings of the 22nd VLDB Conference, Mumbai (Bombay), India, 1996, pp. 330-341.

(Continued)

*Primary Examiner*—Jeffrey Gaffin
*Assistant Examiner*—Tomasz Ponikiewski
(74) *Attorney, Agent, or Firm*—Amin, Turocy & Calvin, LLP

(57) ABSTRACT

The subject disclosure pertains to efficient computation of the difference between queries by exploiting commonality between them. A minimal difference query (MDQ) is generated that roughly corresponds to removal of as many joins as possible while still accurately representing the query difference. The minimal difference can be employed to further substantially the scope of view matching where a query is not wholly subsumed by a view. Additionally, the minimal difference query can be employed as an analytical tool in various contexts.

14 Claims, 18 Drawing Sheets

OTHER PUBLICATIONS

Dayal, U., "Of Nests and Trees: A Unified Approach to Processing Queries That Contain Nested Subqueries, Aggregates, and Quantifiers," in Proceedings of the 13th VLDB Conference, Brighton, England, 1987, pp. 197-208.

Dehaan, D. et al., "Stacked Indexed Views in Microsoft SQL Server," in Proceedings of the ACM SIGMOD Conference 2005, Baltimore, Maryland, Jun. 14-16, 2005, pp. 179-190.

Rundensteiner, E.A., Ed., Special Issue on Data Transformations, Bulletin of the Technical Committee on Data Engineering, vol. 22, No. 1, Mar. 1999, 54 pages.

Flesca, S. et al., "On the Minimization of Xpath Queries," in Proceedings of the 29th VLDB Conference, Berlin, Germany, 2003, 12 pages.

Ganski, R. and Wong, H., "Optimization of Nested SQL Queries Revisited," in Proceedings of the ACM SIGMOD International Conference on Management of Data, 1987, pp. 23-33.

Goldstein, J. and Larson, P., "Optimizing Queries Using Materialized Views: A Pratical, Scalable Solution," in Proceedings of the ACM SIGMOD Conference 2001, Santa Barbara, California, May 21-24, 2001, pp. 331-342.

Graefe, G., "The Cascades Framework for Query Optimization," Bulletin of the Technical Committee on Data Engineering, vol. 18, No. 3, Sep. 1995, pp. 19-28.

Gupta, A. et al., "Aggregate-Query Processing in Data Warehousing Environments," in Proceedings of the 21st VLDB Conference, Zurich, Switzerland, Sep. 1995, pp. 358-369.

Dasu, T. et al., "Mining Database Structure; Or, How to Build a Data Quality Browser," in Proceedings of the ACM SIGMOD International Conference on Management of Data, 2002, Madison, Wisconsin, Jun. 4-6, 2002, pp. 240-251.

Kim, W., "On Optimizing an SQL-like Nested Query," ACM Transactions on Database Systems, vol. 7, No. 3, Sep. 1982, pp. 443-469.

Larson, P. et al., "Transparent Mid-Tier Database Caching in SQL Server," in Proceedings of the ACM SIGMOD Conference 2003, San Diego, California, Jun. 9-12, 2003, p. 661.

Larson, P. and Yang, H., "Computing Queries from Derived Relations," in Proceedings of the VLDB Conference, Stockholm, Sweden, 1985, pp. 259-269.

Larson, P. and Zhou, J., "View Matching for Outer-Join Views," in Proceedings of the 31st VLDB Conference, Trondheim, Norway, Aug. 30-Sep. 2, 2005, pp. 445-456.

Levy, A. and Sagiv, Y., "Queries Independent of Updates," in Proceedings of the 19th VLDB Conference, Dublin, Ireland, 1993, pp. 171-181.

Mandhani, B. and Suciu, D., "Query Caching and View Selection for XML Databases," in Proceedings of the 31st VLDB Conference, Trondheim, Norway, Aug. 30-Sep. 2, 2005, pp. 469-480.

Minock, M. et al., "The Indentification of Missing Information Resources Through the Query Difference Operator," in Proceedings of the 4th International Conference on Cooperative Information Systems (COOPIS '99), Edinburgh, Scotland, Sep. 2-4, 1999, 11 pages.

Muralikrishna, M., "Improved Unnesting Algorithms for Join Aggregate SQL Queries," in Proceedings of the 18th VLDB Conference, Vancouver, B.C., Canada, 1992, pp. 91-102.

Park, C. et al., "Rewriting OLAP Queries Using Materialized Views and Dimension Hierarchies in Data Warehouses," in Proceedings of the International Conference on Data Engineering, 2001, pp. 515-523.

Raman, V. and Hellerstein, J., "Potter's Wheel: An Interactive Data Cleaning System," in Proceedings of the 27th VLDB Conference, Rome, Italy, 2001, pp. 381-390.

Sagiv, Y. and Yannakakis, M., "Equivalences Among Relational Expressions with the Union and Difference Operators," Journal of the Association for Computing Machinery, vol. 27, No. 4, Oct. 1980, pp. 633-655.

Saraiya, Y., "Subtree-Elimination Algorithms in Deductive Databases," Ph.D. Thesis, Stanford University, Stanford, California, 1991, University Microfilms International (UMI), 168 pages.

Srivastava, D. et al., "Answering Queries with Aggregation Using Views," in Proceedings of the 22nd VLDB Conference, Mumbai (Bombay), India, 1996, pp. 318-329.

TPC Benchmark H, Decision Support, Standard Specification Revisions 2.3.0, Transaction Processing Performance Council (TPC), 145 pages. Available online at http://www.tpc.org/tpch/, last accessed on Mar. 15, 2006.

Van Der Meyden, R., "The Complexity of Querying Indefinite Data about Linearly Ordered Domains," in Proceedings of the 11th Principles of Database Systems (PODS), San Diego, California, Jun. 1992, pp. 331-345.

Yan, L. et al., "Data-Driven Understanding and Refinement of Schema Mappings," in Proceedings of the ACM SIGMOD Conference 2001, Santa Barbara, California, May 21-24, 2001, pp. 485-496.

Yang, H. and Larson, P., "Query Transformation for PSJ-Queries," in Proceedings of the 13th VLDB Conference, Brighton, England, 1987, pp. 245-254.

Chang, J. and Lee, S., "Query Reformulation Using Materialized Views in Data Warehouse Environment," in Proceedings of the First ACM International Workshop on Data Warehousing and OLAP, Washington, DC, 1998, pp. 54-59.

Zaharioudakis, M. et al., "Answering Complex SQL Queries Using Automatic Summary Tables," in Proceedings of ACM SIGMOD Conference 2000, Dallas, Texas, pp. 105-116.

* cited by examiner

MINIMAL DIFFERENCE QUERY AND VIEW MATCHING

BACKGROUND

Data-intensive applications such as decision support and e-commerce rely on being able to integrate data from various sources. To accomplish this task, a data transformation query is created between a data source and target. A variety of issues have to be addressed in identifying such a query. The data is often inconsistent owing to factors such as data entry errors and missing information. These inconsistencies must be removed before the data can be loaded and used for analysis. This is further compounded by the presence of mismatches between the source and the target schemas that need to be reconciled. As a result, the problem of data integration is widely recognized to be a significant challenge.

The space of reasonable transformation queries between data source and target can be enormous, and it is very difficult for users to consider and even conceive of all possible options. This is aggravated by the fact that a user may not understand the source data fully. As a result, users need to try different queries iteratively until a satisfactory result is obtained. Previously published work has thus identified the need for interactive tools that help users understand the impact of a transformation query.

In such an interactive environment, it is natural to reason about the difference between queries. Even a small change to a transformation query, such as changing a join column, relaxing an equi-join to a join that exploits string similarities (also known as similarity joins), changing the thresholds for similarity comparison or adding an extra join can have substantial impact on the results of the query. It is therefore very natural to ask whether such a change produces tuples that are expected at the result but were previously absent or suppresses tuples that were erroneously generated.

Of course, the difference between queries can be computed in SQL (Structure Language Query), using the EXCEPT, EXCEPT ALL or MINUS clause. However, the performance of this approach is highly inadequate, especially when the two queries are closely related to each other. In particular, assume there are two queries $Q_1$ and $Q_2$. Conventionally, the difference is computed by executing both $Q_1$ and $Q_2$ and then determining the difference.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described the subject innovation pertains to systems and methods of efficiently computing the difference between queries. In accordance with one aspect of the subject innovation, a principled approach is employed based on identifying joins that can be eliminated when computing the query difference. This is characterized by defining the notion of a minimal difference query (MDQ) that roughly corresponds to minimizing the number of joins. Systems and methods are disclosed for obtaining the minimal difference query that are adapted to both set and bag semantics.

In accordance with another aspect of the subject innovation, the systems and methods can be extended to exploit known or determined metadata including but not limited to functional dependencies (e.g., key constraints) and inclusion dependencies (e.g., foreign key constraints). This metadata can be employed to improve query difference performance further by providing an opportunity to eliminate additional joins, for example based on redundant conjuncts.

According to yet another aspect of the subject innovation, the query difference system and method can be exploited to further the scope of view matching technology in the case when the results of a query are only partially covered by a view. This can be accomplished by, among other things, incorporating the aforementioned difference operations into view matching. In an interactive environment, this strategy widens the possibility of using the results of previously executed queries in answering a query. This approach is especially useful when the queries are closely related, as is often the case in an interactive environment.

Additionally or alternatively, aspects of the subject innovation can be employed in an analytical tool (e.g., client and/or server side) useful in contexts including but not limited to data cleaning, data integration and schema matching. For example, utilizing such a tool an entity or individual can reason whether a specific change to a query produces tuples that were expected but not found or suppresses tuples that were erroneously returned.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
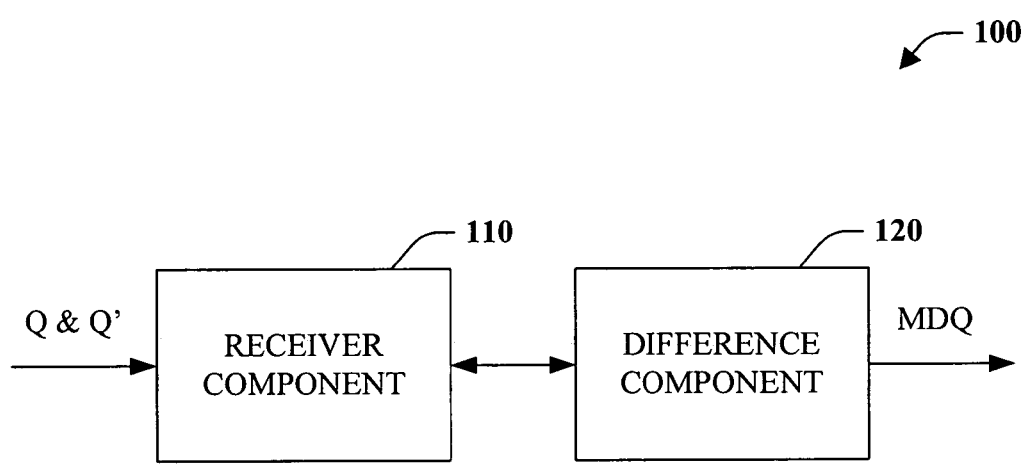
FIG. 1 is a block diagram of a query difference system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or portion thereof in any manner. It is to be appreciated that a myriad of additional or alternate examples could have been presented, but have been omitted for purposes of brevity.

Additionally, this detailed description considers a conjunctive SQL query Q of the form:

SELECT collist(Q)
FROM rellist(Q)
WHERE pred(Q)

Collist(Q) denotes a list of returned attributes, rellist(Q) identifies a list of involved relations and pred(Q) specifies conjunction predicates. It should be appreciated that since results extend to queries including union and difference, the predicates can also include disjunction.

D can be a database. In such instance, Q(D) denotes that query results of the evaluation of query Q on database D.

For notational convenience, queries are written using the standard notation for conjunctive queries. In brief, a conjunctive query has the following form: $Q(V):-c_1, c_2, \ldots, c_n$, where V is a set of return variables, called head variables (also denoted as head(Q)), and $c_1, \ldots, c_m$ are conjuncts. Each conjunct can be a relational atom $R_i(V_i)$ where $R_i$ is a relation and $V_i$ is a tuple of variables and constants or a Boolean predicate involving variables that are present in some relational atom. Herein, the variables in V are called bound, and the rest are free variables. The set of free variables in Q is denoted as $V_Q^f$. By way of example and not limitation, consider the following two queries Q and Q':

Q(n, p):-R(n, a, "USA"), S(n, p, cc)
Q'(n, p):-R(n, a, cn), S(n, p, cc), USAddr(a)

Here, variables n and p are bound in both Q and Q'. Variables a and cc are free in Q and a, cn, and cc are free with respect to Q'.

The similarity function is denoted herein as sim. Such notation is employed regardless of the type including but not limited to edit distance and jaccard similarity. For instance, the following query $Q_{dc}$ represents a similarity join between relations R and S: $Q_{dc}(n, p):-R(n, a, \text{"USA"}), S(n', p, cc), sim(n, n') \geq \theta$. It requires joining of all pairs of tuples whose similarity on the n column is above threshold $\theta$.

Computing the difference between queries forms a natural analytical tool, useful in many contexts including but not limited to data cleaning, data integration and schema matching. For instance, such a tool can be employed by a system or individual to reason about whether a specific change to a query produces tuples that were expected at the result, but were absent, or suppresses tuples that were erroneously generated.

Referring initially to FIG. 1, a query difference system 100 is illustrated in accordance with an aspect of the subject innovation. The system 100 includes a receiver component 110 and a difference component 120. The receiver component 110 can receive, retrieve or otherwise obtain or acquire at least two queries. For instance, the receiver component 110 can receive query Q and query Q'. The receiver component 110 can correspond to any one of a number of different technologies including but not limited to an application programming interface (API) or graphical user interface or environment. The receiver component 110 is communicatively coupled to the difference component 120. The difference component 120 receives or retrieves queries from the receiver component 110. Here, the difference component 120 receives Q and Q'. The difference component 120 generates a minimal difference query representing the difference between queries, such as Q-Q'.

At present, the difference could be computed using a difference operator such as minus, except or except all in SQL, but these conventional operators are very inefficient. In particular, the difference between Q and Q' is generated by executing both Q and Q' and subsequently taking the difference. That is very expensive. The difference component 120 can accomplish such a task by rewriting or generating a query that is much more efficient than executing Q and Q' and then discovering the difference.

Consider the flowing example that illustrates why a naïve approach to compute query difference can be sub-optimal and how the subject innovation provides an efficient rewriting. Consider a scenario where there are multiple customer databases in an enterprise with different attributes represented by tables R, S and USAddr, where the variable names for exemplary conjunctive queries presented infra appear in parentheses:

TABLE R

| cname (n) | address (a) | country (cn) |
|---|---|---|
| Alice | 10101, 100th St., Auburn, Alabama 12345 | U.S.A. |
| Bob | 2020, 22nd Ave., Bentonville, Arkansas 23456 | null |

TABLE S

| cname (n) | phone (p) | credit card (cc) |
| --- | --- | --- |
| Alice | (101) 123-4567 | 1234 5678 3456 7890 |
| Bob | (303) 765-4321 | 2345 6789 4567 8901 |

TABLE USAddr

| address |
| --- |
| 1010, 100$^{th}$ St., Auburn, Alabama 12345 |
| 2020, 22$^{nd}$ Ave., Bentonville, Arkansas 23456 |

Specifically, assume there are relations R(cname, address, country) and S(cname, phone, credit card) and we wish to join customers in the United States on the cname column. Consider the first query Q:

Q: SELECT R.cname, S.phone
   FROM R, S
   WHERE R.country = 'USA' AND R.cname = S.cname Execution of such a query would generate table Q as follows:

TABLE Q

| cname | phone |
| --- | --- |
| Alice | (101) 123-4567 |

If the result is not as expected, perhaps because many of the country values are unavailable (null), one could issue a refined query by exploiting the fact that a standard address table USAddr is available for the United States (e.g., from the U.S. Postal Service). The refined query is Q':

Q' SELECT R.cname, S.phone
   FROM R, S, USAddr
   WHERE R.cname = S.cname
   AND R.address = USAddr.address Upon execution the table Q' may be produced:

TABLE Q'

| cname | phone |
| --- | --- |
| Alice | (101) 123-4567 |
| Bob | (303) 765-4321 |

One may now wish to find the set of distinct tuples returned by Q but not by Q', to ensure that expected tuples are not missed.

At first glance, one may incorrectly conjecture that the difference can be generated by negotiating the extra predicate R.address = USAddr.address in Q':

FDQ: SELECT DISTINCT R.cname, S.phone
   FROM R, S, USAddr
   WHERE R.country = 'USA'
   AND R.cname = S.cname
   AND R.address <> USAddr.address This is not true. There is not tuple that is returned by Q but not by Q'. However, FDQ generates tuple ('Alice', '(101) 123-4567') by joining R ("Alice", '10101 100$^{th}$ St., Auburn, Ala. 12345', 'USA'), S('Alice', "(101)123-4567", "1234 5678 3456 7890") and USAddr('2020 22$^{nd}$ Ave., Bentonville, Ark. 234546').

One could instead, compute the difference using the EXCEPT clause: Q EXCEPT Q'. An alternative is to use a nested query:

DQ: SELECT DISTINCT R.cname, S.phone
   FROM R, S
   WHERE R.cname = S.cname and R.country = 'USA'
   AND NOT EXISTS (
     SELECT *
     FROM R AS R1, S AS S1, USAddr
     WHERE R.cname = R.cname
      AND S1.phone = S.phone
      AND R1.cname = S1.sname
      AND S1.address = USAddr.address)

Note that these rewritings are quite inadequate since Q and Q' have substantial parts in common. In accordance with an aspect of the subject innovation, the commonality can be exploited to produce the following rewriting:

MDQ: SELECT DISTINCT R.cname, S.phone
   FROM R, S
   WHERE R.cname = S.cname AND R.country = 'USA'
   AND NOT EXISTS (
     SELECT *
     FROM R AS R1, USAddr
     WHERE R1.cname = R.cname
      AND R1.address = USAddr.address)

Observe that MDQ removes the join between R1 and S1 and the join between S1 and S and thus can be evaluated more efficiently. In fact, experiments show that using the optimized rewriting indeed yields significant speedup in performance, often by factors of more than ten.

It should also be noted that this example illustrates the computation of the set difference corresponding to SQL Q EXCEPT Q'. The bag difference Q EXCEPT ALL Q' is addressed in a later section. More formally, let Q and Q' be two queries that return the same set of attributes. The set difference between Q(D) and Q'(D), denoted Q(D)$-^s$Q'(D), is the set of distinct tuples returned by Q(D) but not by Q'(D). The bag difference between Q(D) and Q'(D) denoted as Q(D)$-^b$Q'(D), is obtained by taking the tuples in Q(D) and subtracting their multiplicities in Q'(D). Query DQ is said to be the set-difference (resp. bag-difference) between Q and Q' if for every database D, DQ(D)=Q(D)$-^s$Q'(D) (resp. DQ(D) =Q(D)$-^b$Q'(D)).

It should be noted that conjunctive queries are not closed under difference. In other words, a query Q$-^s$Q' may not be representable as a conjunctive query. The notation $\not\exists$ is utilized to allow NOT-EXISTS sub queries. The difference query can be defined in the form: DQ(V):−$c_1$, $c_2$, . . . , $c_m$, $\not\exists$ ($c'_1$, $c'_2$, . . . $c'_n$), where each $c_i$ and $c'_j$ is a conjunct and the free variables present in $c_1$, $c_2$, . . . , $c_m$ are disjoint from those present in $c'_1$, $c'_2$, . . . $c'_n$ (by suitably renaming variables one can assume this without loss of generality).

The semantics of DQ(V) is to find the set of all values assigned to V, such that the conjuncts $c_1$, $c_2$, . . . , $c_m$ are satisfied but $c'_1$, $c'_2$, . . . $c'_n$ cannot. Conjuncts in the $\not\exists$ clause are called negative conjuncts and the rest are referred to as positive conjuncts.

Observer that the difference query DQ as written above is a straightforward or naïve set-difference between Q and Q' defined as follows:

Q(V):−$c_1$, $c_2$, . . . , $c_m$
   Q'(V):−$c'_1$, $c'_2$, . . . , $c'_n$

Consider queries Q and Q' in the example above. First, the variables are subsumed in Q' such that Q and Q' do not share common free variables:

Q'(n, p):–R(n, a', cn'), S(n, p, cc'), USAddr(a')

The plain or naïve rewriting of Q–Q' is as follows:

(Q–$^s$Q')(n, p):–R(n, a, "USA"), S(n, p, cc)

∄ (R(n, a', cn), S(n, p, cc'), USAddr(a'))

The positive conjuncts are R(n, a, "USA") and S(n, p, cc). The negative conjuncts are R(n, a', cn), S(n, p, cc') and USAddr(a').

The evaluation cost of a difference query is typically dominated by the number of joins, which is roughly proportional to the number of atomic conjuncts it contains. Here, difference component 120 can produce a minimal difference query that minimizes the number of negative conjuncts. As a result, it also tends to minimize the number of joins.

The minimal difference query generated by difference component 120 can be defined logically as follows: Let Q and Q' be two conjunctive queries. Query DQ is a minimal difference query (MDQ) of Q–Q', if (1) DQ=Q–Q', (2) the negative conjuncts in DQ are a subset of the conjuncts in Q', and (3) there does not exist a query DQ' such that DQ' satisfies conditions (1) and (2) and contains less negative conjuncts.

By way of example, consider the ongoing example concerning Q and Q'. Another rewriting, MDQ, corresponds to the following conjunctive query and includes fewer negative conjuncts.

(Q–$^s$Q')(n, p):–R(n, a, "USA"), S(n, p, cc)

∄ (R(n, a', cn), USAddr(a'))

Figure 2:
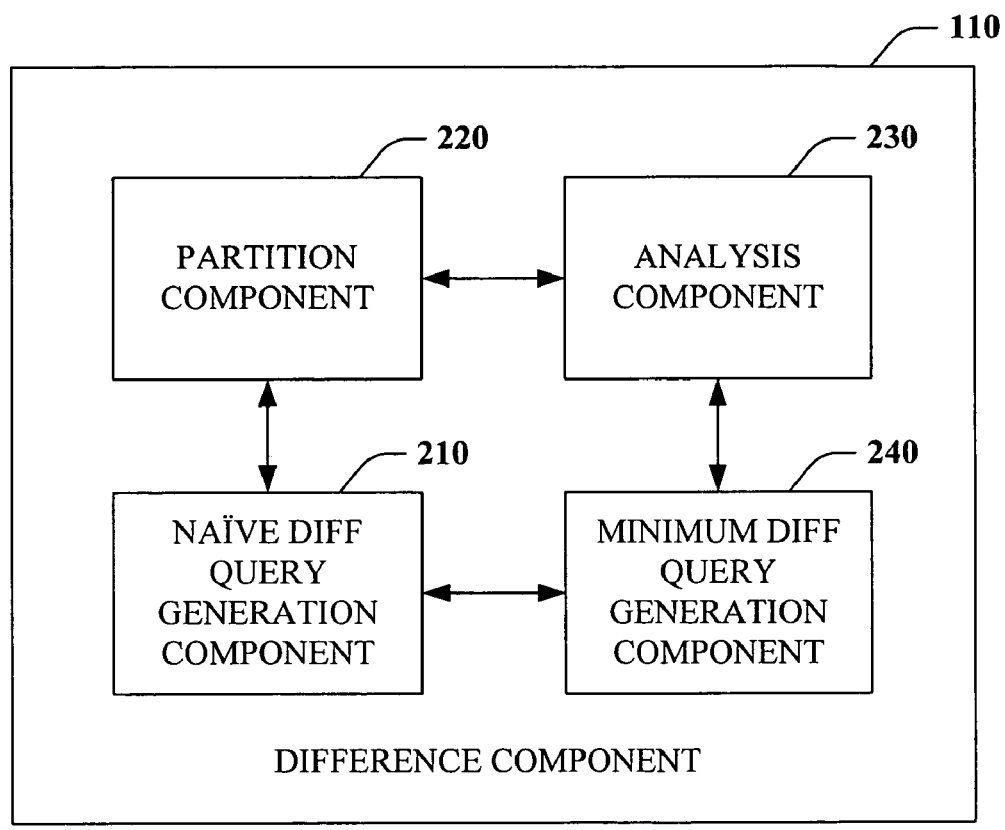
FIG. 2 is a block diagram of a difference component.

Referring now to FIG. 2, a difference component 120 is illustrated in accordance with an aspect of the subject innovation. The difference component 120 includes a naïve difference generation component 210. The component 210 generates a conventional, standard or naïve difference query as is known in the art. In the ongoing example, this corresponds to:

(Q–$^s$Q')(n, p):–R(n, a, "USA"), S(n, p, cc)

∄ (R(n, a', cn), S(n, p, cc'), USAddr(a'))

The difference generation component 210 is communicatively coupled to partition component 220. The generation component 210 can therefore transmit the generated naïve query to the partition component 220.

Upon receipt, the partition component 220 can partition conjuncts. More particularly, negative conjuncts can be partitioned minimally so that no two chunks share free variables. As per the provided example, the partition component 220 can identify the fact that the negative conjunct S(n, p, cc') is not joined with any other negative conjuncts through free variables. Hence, it follows that the predicate ∄ (R(n, a', cn), S(n, p, cc'), USAddr(a')) can be split into the disjunction of two predicates ∄ (R(n, a', cn), USAddr(a')) and ∄ S(n, p, cc'), since ¬(x∩y)=¬x∪¬y. As a result, the above rewriting is equivalent to a union of the following two difference queries:

DQ$_1$(n, p):–R(n, a, "USA"), S(n, p, cc)

∄ (R(n, a', cn), USAddr(a'))

DQ$_2$(n, p):–R(n, a, "USA"), S(n, p, cc)

∄ S(n, p, cc')

The partition component 220 is also communicatively coupled to analysis component 230. Analysis component 230 can receive, retrieve, or otherwise obtain or acquire a partitioned query from partition component 220. The analysis component 230 can identify negative conjuncts that can be removed. The idea is that removing atom conjuncts corresponds to removing joins and hence can lead to improved performance. With respect to the above difference queries, the analysis component 230 can note that the query DQ$_2$ produces an empty result, because the negative conjunct S(n, p, cc') is inconsistent with the positive conjuncts R(n, a, "USA")∩S(n, p, cc). This inconsistency follows from the fact that Q*⊆S*, where Q* (n, p):–R(n, a, "USA"), S(n, p, cc)

S* (n, p):–S(n, p, cc')

Hence, the negative conjunct S(n, p, cc') is redundant and can be removed.

More formally, consider Q and Q' that are two conjunctive queries defined as follows:

Q(V):–$c_1$, $c_2$, . . . , $c_m$

Q'(V):–$c'_1$, $c'_2$, . . . , $c'_n$, $c'_{n+1}$, . . . $c'_1$

Let P={$c'_1$, $c'_2$, . . . , $c'_n$} and R={$c'_n$, $c'_{n+1}$, . . . $c'_1$}. Let $V_P^f$, $V_R^f$, $V_Q^f$ be free variables in P, R, Q, respectively. The following conjunctive queries can be constructed:

P($V_P^b$):–$c'_1$, $c'_2$, . . . , $c'_n$

QR($V_P^b$):–$c'_{n+1}$, . . . $c'_1$, $c_1$, . . . , $c_m$

The equation Q∩∄ (P∩R)=Q∩∄ R holds if two conditions are satisfied. First, $V_P^f$ and $V_R^f$ are disjoint. This corresponds, among other things, to the transformation by partition component 220 into a union of difference queries. Second, QR⊆P such that there is a variable mapping σ: $V_P^f$→$V_R^f$∪$V_Q^f$∪V that induces a homomorphism from P to QR. This detects the cases where a set of conjuncts is redundant. In the ongoing example, R(n, a', cn) cannot be removed because it shares free variable a' with USAddr(a') and those violates the first condition. In addition, R(n, a', cn)∩USAddr(a') should not be removed as there does not exist a homomorphism mapping from it to R(n, a, "USA")∩S(n, p, cc)∩S(n, p, cc'). However, the negative conjunct S(n, p, cc') can be removed, because it maps to the positive conjunct S(n, p, cc).

Minimal difference query generation component 240 can generate a minimal difference query with redundant conjuncts removed. Generation component 240 is communicatively coupled to both the analysis component and the naïve difference generation component 210. The generation component 240 can receive, retrieve, or otherwise obtain the identity of redundant conjuncts from the analysis component 230. The component 240 can also receive the naïve representation from the naïve difference generation component 210 and generate the minimal difference query by removing the identified redundant conjuncts.

Figure 3:
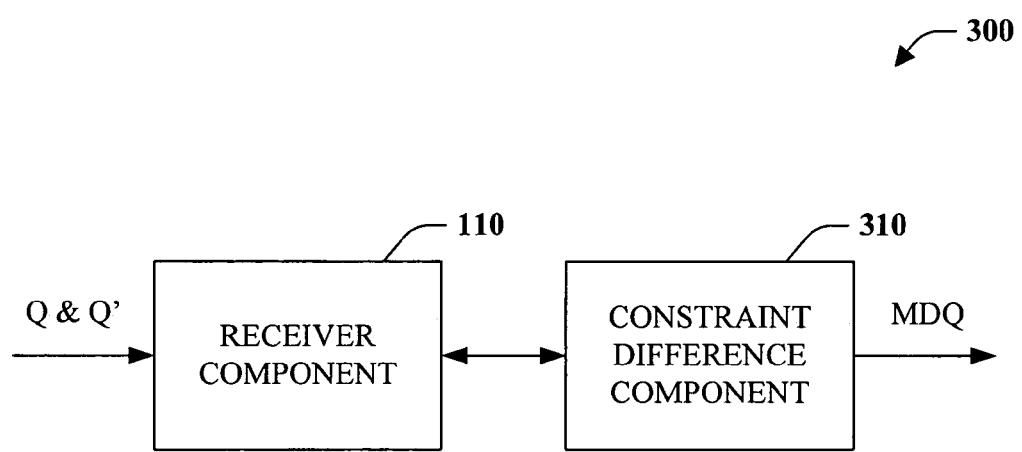
FIG. 3 is a block diagram of a query difference system.

Turning attention to FIG. 3, a query difference system 300 is illustrated in accordance with an aspect of the subject innovation. The query difference system 300 includes a receiver component 110 and a constraint difference component 310. As described previously, the receiver component can received, retrieve, or otherwise obtain or acquire two or more queries. For example, the receiver component 110 can receive query Q and query Q'. The receiver component 110 is communicatively coupled to constraint difference component 310. Accordingly, the receiver component can transmit or otherwise provide queries to the constraint difference component 310. Similar to the difference component 110 of FIG. 1, the constraint difference component 310 is operable to generate a minimal difference query that minimizes the number of conjuncts and as a result also tends to minimize the number of joins. However, the constraint difference component 310 can also exploit schema constraints to facilitate removal of more constraints based thereon. For instance, knowledge of metadata such as key constraints, foreign key constraints and functional dependencies can often further simplify the generated difference query.

Figure 4:
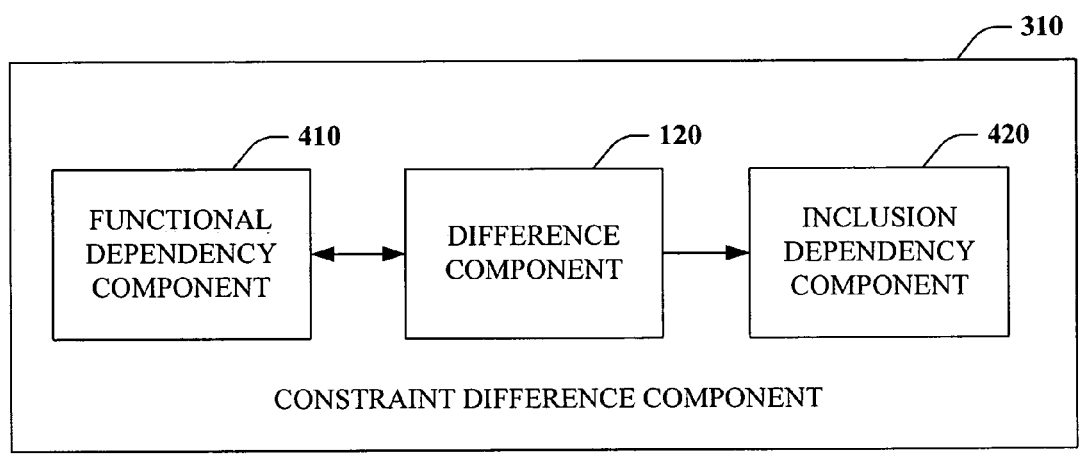
FIG. 4 is a block diagram of a constraint difference component.

Referring to FIG. 4, the constraint difference component 310 is illustrated in accordance with one aspect of the subject innovation. The constraint difference component 310 includes a difference component 120 as previously described. Additionally, the constraint difference component 310 includes and is communicatively coupled to functional dependency component 410 and an inclusion dependency component 420. Functional dependency component 410 aids the difference component 120 by identifying conjuncts that can be eliminated based on functional dependencies including but not limited to key constraints. Formally, let $V_K \rightarrow v$ denote the fact that the values of variables in $V_K$ functionally determine the value of variable v. Component 410 can use the functional dependency by noting that if all variables in $V_K$ are bound, then v is determined and can be thought of as bound as well. This opens up the possibility of eliminating more negative conjuncts, as illustrated by the example that follows.

Consider the ongoing example pertaining to $Q-^sQ'$. Suppose it is known or it can be determined that cname is the key of table R. Variable substitution can be applied and an extra bound variable set ({a}) can be generated. The two queries can be rewritten as follows:

Q(n, a, p):–R(n, a, "USA"), S(n, p, cc)
Q'(n, a, p):–R(n, a, "USA"), S(n, p, cc'), USAddr(a)

Since the key attribute cname is returned by the query, the atomic conjunct R in Q' is identical to that in Q.

The information determined by the functional dependency component 410 can be provided to the difference component 120. The difference component 110 can note that since variable a is considered as bound now, the negative conjuncts can be partitioned into smaller independent partitions, each with higher possibility to be redundant. Indeed, as per the ongoing example the predicate R(n, a, "USA") can be removed resulting in the following:

$(Q-^sQ')$ (n, p):–R(n, a, "USA"), S(n, p, cc)
⊉ USAddr(a)

Inclusion dependency component 420 can act similarly to further identify and aid removal of redundant conjuncts based on inclusion dependencies including but not limited to foreign key constraints. In the aforementioned example, if it is known or can be determined by component 420 that attribute address in R is the foreign key to relation USAddr, for instance, then it is known beforehand that all tuples in R can join with some tuple in USAddr. Accordingly, Q is contained in Q' and $Q-^sQ'=0$.

Formally, let A and B be two relations (not necessarily different). Let A(V)⊆B(V') denote the inclusion dependency that the values of attributes in V must be included in the values of attributes in V'. Consider a positive conjunct $A(V_A, V)$ and a negative conjunct $B(V', V_B)$, where $V_A$ and $V_B$ are two sets of variables. If $V_B$ contains only free variables not occurring anywhere else, the existence of tuple $A(V_A, V)$ according to the inclusion dependency implies the existence of tuple $B(V, V_B)$. This constitutes a conflict that difference component 120 can remove $B(V, V_B)$ upon generation of a minimal difference query.

Continuing with the previous example with respect to functional dependencies, suppose it is known or it can be determined that the attribute address is a foreign key to relation S. Given the existence of positive conjunct R(n, a, "USA"), USAddr(a) can be removed and the result becomes:

$(Q-^sQ')$ (n, p):–R(n, a, "USA"), S(n, p, cc)
⊉ (true)

Thus, the result is empty.

It should be noted that the running time associated with the difference component 120 and related algorithm is dominated by the time taken to check homomorphism. Let c be the number of conjuncts in Q', and v and v' be the number of free variables in Q and Q' respectively. Finding homomorphism takes time $v'^{(v+v')}$, and homomorphism needs to be found for no more than c times. Thus, the algorithm has a worst-case time complexity of $O(c*v'^{(v+v')})$.

Figure 5:
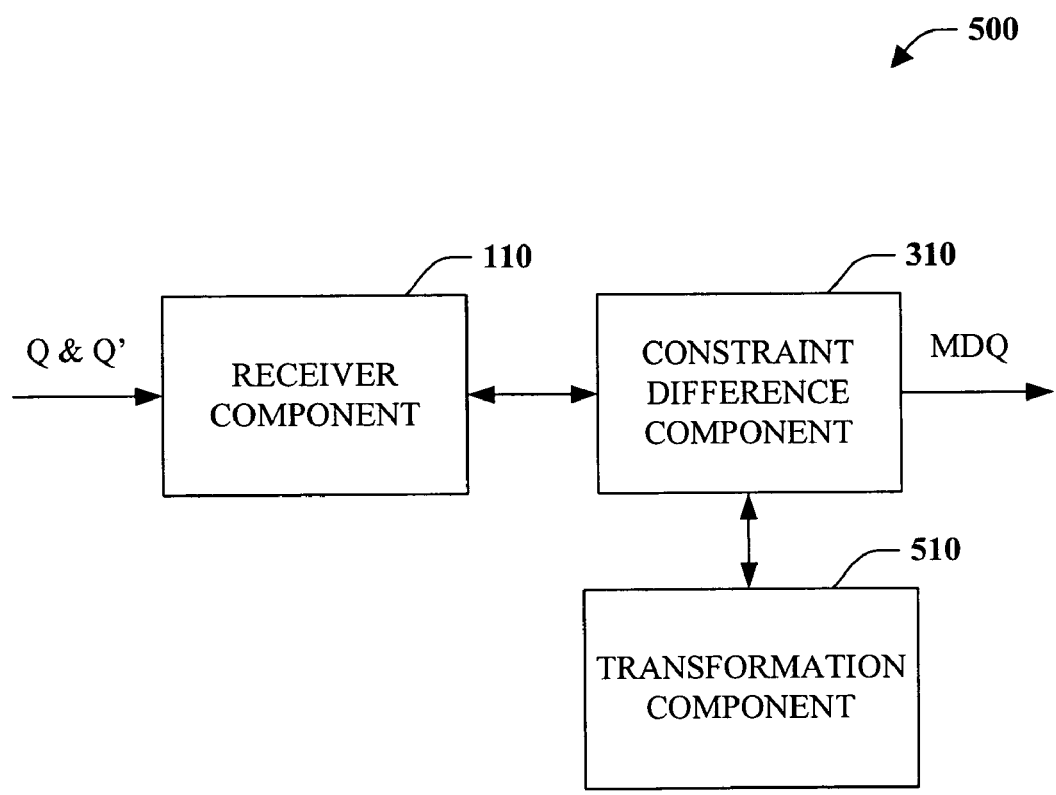
FIG. 5 is a block diagram of a query difference system.

Referring to FIG. 5, a query difference system 500 is illustrated in accordance with an aspect of the subject innovation. While previous systems 100 and 300 can deal with set semantics, the innovative aspects can also be extended to bag semantics. Bag-semantics differs from set-semantics in counting duplicates. This has significant implications on query difference computation. System 500 provides that extension in the form of transformation component 510 communicatively coupled to the constraint difference component 310. Hereinafter, it is first shown that the bag difference between two queries cannot always be written as a difference query. Next, a subclass of queries where the bag difference can be expressed as a difference query is provided and the mechanism for generation of MDQs for such queries is presented.

Consider the queries Q and Q' reproduced in their conjunctive forms as below:

Q(n, p):–R(n, a, "USA"), S(n, p, cc)
Q'(n, p):–R(n, a, cn), S(n, p, cc'), USAddr(a)

The bag difference $Q'-^bQ$ cannot be expressed as a difference query. In fact, consider a relation USAddr that contains duplicative addresses where "10101, 100$^{th}$ St., Auburn, Ala. 12345," for example, has n occurrences. Then Q returns "Alice," "(101) 123-4567" with one occurrence and Q' returns the same thing with n occurrences. The result of $Q'-^bQ$ should include "Alice," "(101) 123-4567" with n-1 occurrences, but no difference query computes this result for all n. However, a subset of cases exists where the minimal difference query can be computed efficiently.

Considering a class of 1-SQL queries where each relation occurs at most once, the focus is on the case where rellist(Q) ⊆ rellist(Q'). The transformation component 510 can reduce the case to that of a set difference by suitable transformation. For example, the transformation component 510 can introduce id columns for all relations. The id functionally determines other attributes, hence we can eventually apply a set difference means or mechanism.

By way of example, a conjunctive query Q can be transformed by projecting the id column of each relation to the head of the query. This can be called $Q_{id}$ as follows:

$Q_{id}$(rid, sid, n, p):–R(rid, n, a, "USA"), S(sid, n, p, cc)

The result of $Q_{id}$ projected on to the head variables in Q (i.e., (n, p)) is the same as the result of Q.

One should appreciated that query difference can be employed to improve view matching technologies. Conventional view matching techniques address only cases where a query is wholly subsumed by a materialized view. However, one could utilize a view to partially answer a query and going to the base tables, for example, for the rest by posing a remainder query. This requires techniques that can compute an efficient remainder query for the input query and view(s).

Figure 6:
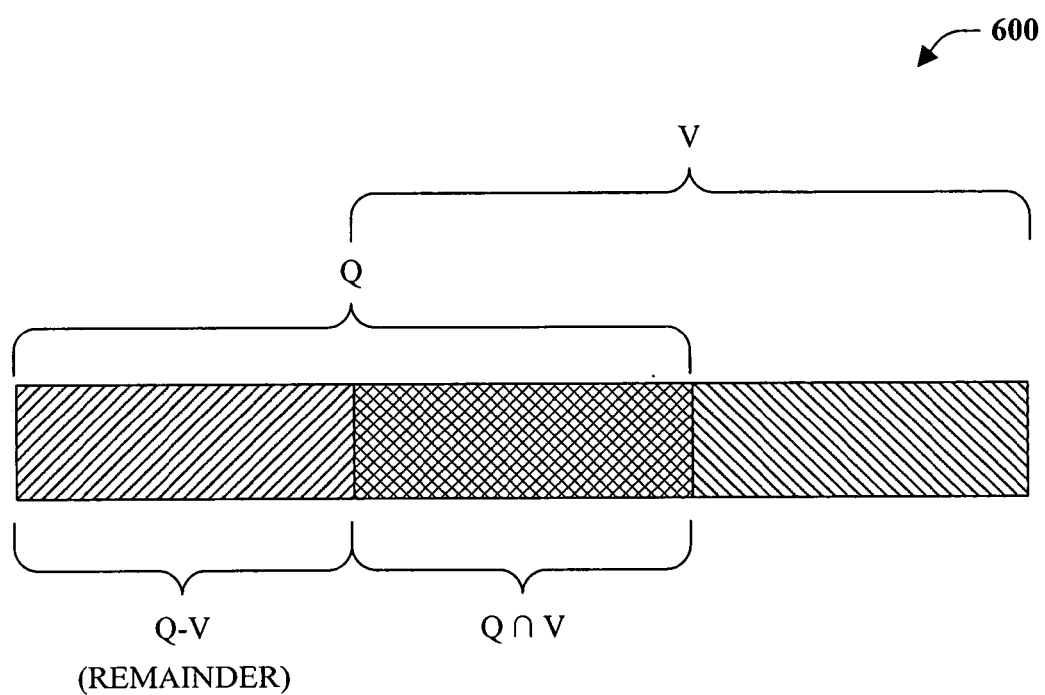
FIG. 6 is a diagram of query and view portions with respect to view matching.

Referring to FIG. 6, query and view portions 600 are depicted in accordance with an aspect of the subject innovation. Let Q be a 1-SQL query and V be a materialized 1-SQL view. Suppose rellist(Q)⊆rellist(V). The problem pertains to rewriting Q utilizing V. As depicted in FIG. 6, Q can be divided logically into two parts: the intersection query IQ=Q∪V and the remainder query DQ=Q−V. Since IQ is subsumed by V one would expect to evaluate it using V. A database can be employed to evaluate the remainder query DQ. Such a scheme can largely improve query execution efficiency if Q and V are highly overlapped and DQ can be computed efficiently.

Figure 7:
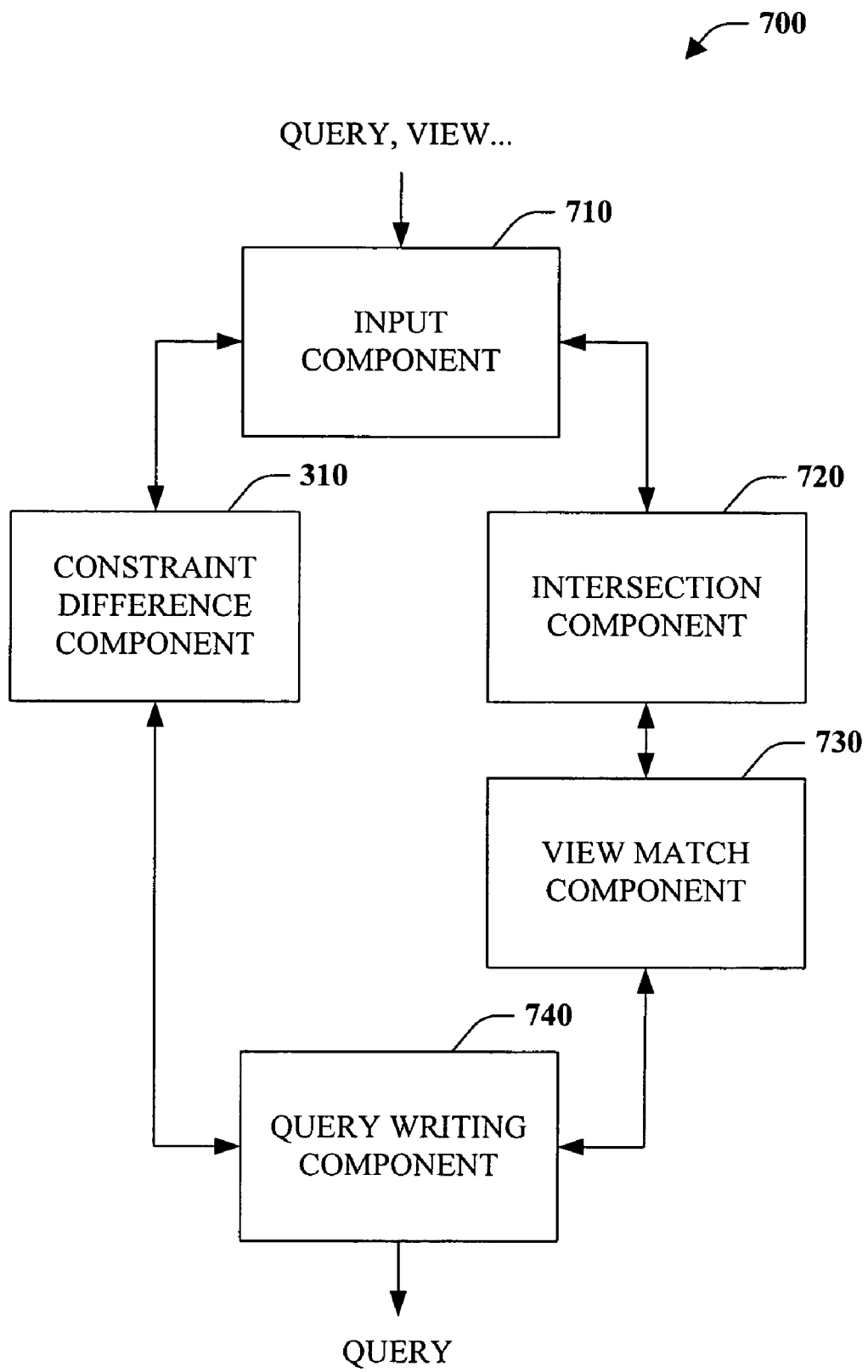
FIG. 7 is a block diagram of a view matching system.

Turning attention to FIG. 7, a view matching system 700 is depicted in accordance with an aspect of the subject innovation. The system includes an input component 710 that receives, retrieves or otherwise obtains or acquires a query and one or more views. The input component 710 can provide this data to the intersection component 720 and the constraint difference component 310 communicatively coupled thereto. The intersection component 720 can determine the intersection between the query and the view(s). The determined intersection can be transmitted from the intersection component 720 to the view map component 730. The view map component 730 can then apply a view matching algorithm to the intersection and the view such that the intersection is rewritten in terms of the view. This new intersection representation is communicated to the query writing component 740. The constraint difference component determines the difference between the query and the view and produces a representation thereof. This representation is received or retrieved by the query writing component 740 and together with the intersection is used to rewrite or generate a query as the union of the intersect and the difference.

To illustrate the operation of system 700 consider the following based on the ongoing example. Q can be utilized to represent the query and a slightly modified version of Q' as the view. The definition of the view V is shown below.

V: SELECT R.Name, R.country, S.phone
    FROM R, S, USAddr
    WHERE R.cname = S.cname AND
      R.address = USAddr.address View V is the same as query Q' except that it also returns attribute country. We further assume that the attribute address is a key of the relation USAddr.

The intersection between Q and V is captured through the following query.

IQ: SELECT R.country, R. name, S.phone
    FROM R, S, USAddr
    WHERE R.cname = S.cname
      AND R.address = USAddr.address
      AND R.country = 'USA'

The above expression for Q∩V is correct since address is a key for the relation USAddr so the multiplicities of result tuples are preserved.

The intersection query can be written using V by adding the select predicate on R.country. The remainder query is generated by applying the bag difference algorithm. Hence, Q can be written using V as follows:

(SELECT name, phone
  FROM V
  WHERE country = 'USA')
  UNION ALL
  (SELECT name, phone
  FROM R, S
  WHERE R.cname = S.cname AND R.country = 'USA'
  AND
  NOT EXISTS (SELECT *
    FROM USAddr
    WHERE R.address = USAddr.address))

Note that this rewriting involves a NOT-EXISTS clause in the remainder query, in addition to the join predicate already present in the query. This is in contrast with the intuition where we prefer to remove predicates. However, using conventional unnesting rules to flatten this remainder query, the database server can transform it into an anti-join between relation R and USAddr and then evaluate it efficiently. In the above example, depending on the size of the relations involved and the physical design of the database, the rewritten query can be executed substantially faster than the original query Q. Indeed, experiments have found that the rewritten query improved the performance by a factor of three. In general, however, the database server should evaluate the cost of the above rewriting before adopting it.

It should be noted that when query Q and view V contain grouping and aggregation (e.g., sum, count, min, max . . . ), the system 700 can proceed by first removing grouping and aggregation to extract the SPJ core of Q and V denoted as $Q_{spj}$ and $V_{spj}$ respectively. Thus, view match component 730 can rewrite $Q_{spj}$ using $V_{spj}$. Then, to each input to the union-all operation, the grouping and aggregation can be added back. Finally, the outer grouping and aggregation can be added to obtain the final aggregate.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
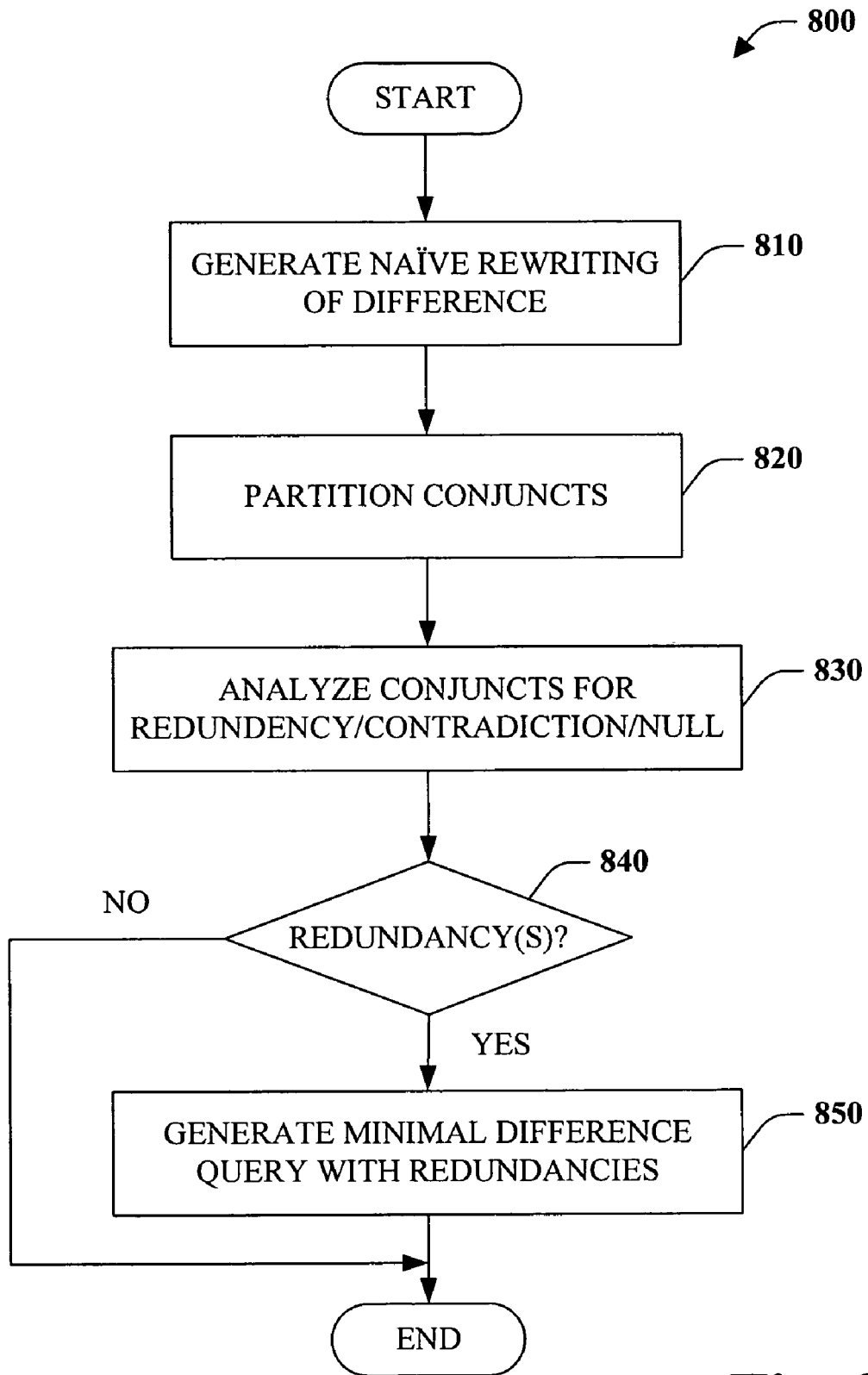
FIG. 8 is a flow chart diagram of a method of generating a minimal set difference query.

Turning to FIG. 8, a method of generating a minimal set difference query 800 is illustrated in accordance with an aspect of the subject innovation. At reference numeral 810, a naïve rewriting of the difference $Q-^sQ'$ is generated. At 820 the conjuncts in $Q'$ are partitioned. In particular, each conjunct can initially form a partition by itself. For every two conjuncts that share the shave common free variables, the partitions they belong to can be merged. This process can be continued until no more partitions can be merged. At numeral 830, each partition can be analyzed to determine if any conjuncts are redundant, contradictory or null. At 840 a determination is made as to whether there are any redundant or like conjuncts. If no, the method 800 simply terminates. In such a case, the naïve query is the minimal difference query. If yes, then the method 800 proceeds to reference numeral 850 where a minimal difference query is generated with redundant negative conjuncts removed.

Figure 9:
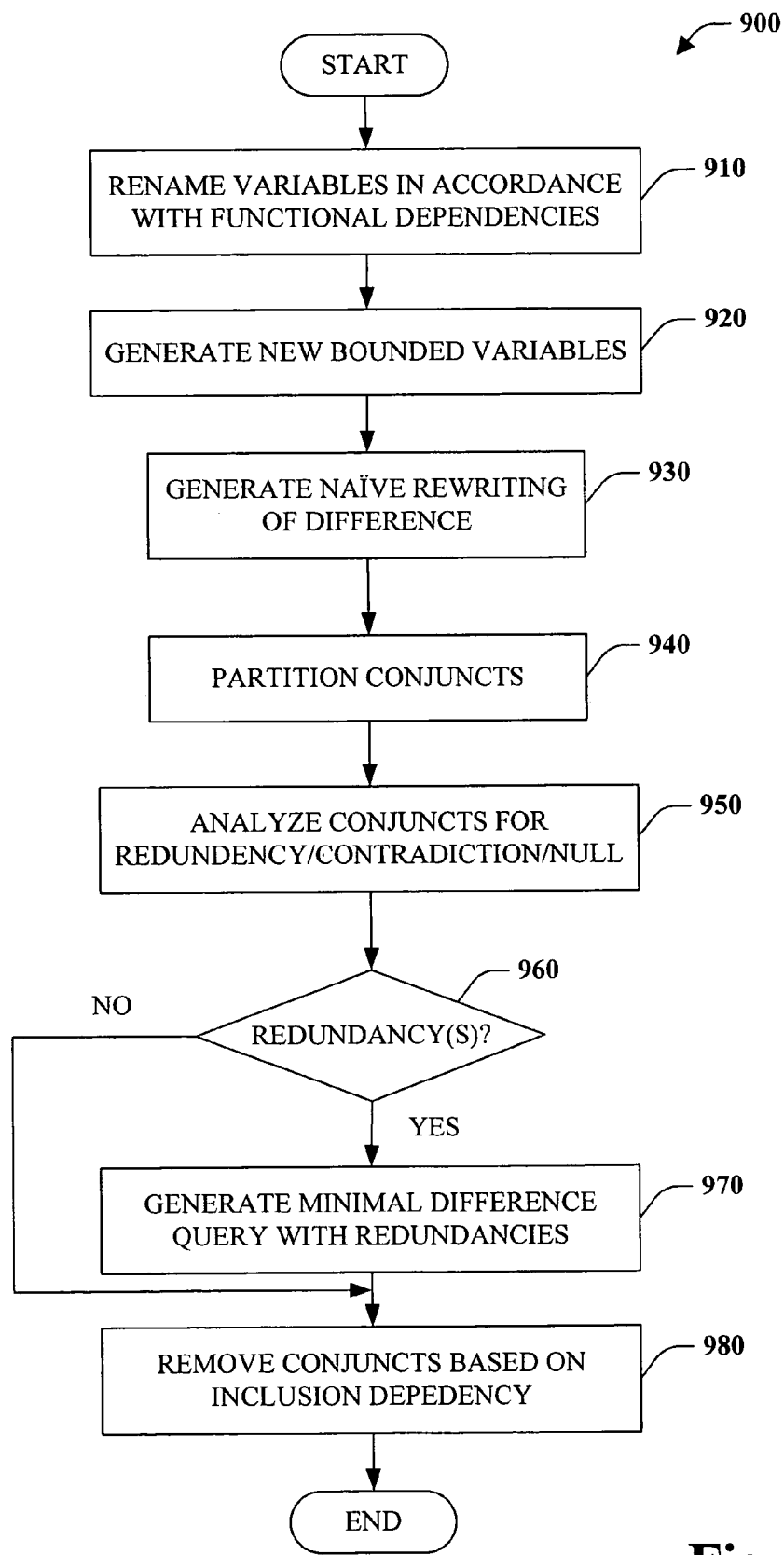
FIG. 9 is a flow chart diagram of a method of generating a minimal set difference query exploiting constraints.

Referring to FIG. 9, a flow chart diagram of a method 900 of generating a minimal difference query exploiting constraints is illustrated. At reference numeral 910, variables in Q and Q' are renamed in accordance with functional dependencies. For example, if $V_K$ functionally determines v, then rename all occurrences of v using the same variable. At 920, new bounded variables are generated, for instance $V_Q^d \subseteq V_Q^f$, where for each variable $v \in V_Q^d$, there exists a set of variables $V_K \subseteq V$ that functionally determines v. At 930, a naïve rewriting of the difference is generated. At 940, conjuncts are partitioned. At numeral 950, conjuncts are analyzed for redundancy, contradiction or null. At 960, a determination is made as to whether there are any redundant conjuncts. If yes, a minimal difference query is generated without redundancies at 970 and the method 900 proceeds to 980. If no, the method simply proceeds to 980. At reference numeral 980, further redundant conjuncts are removed based on inclusion dependency. For example, for each include dependency $A(V) \subseteq B(V')$, check if there is a positive conjunct $A(V_A, V)$ and a negative conjunct $B(V', V_B)$ where all variables in $V_S$ are free variables occurring nowhere else. If so, remove $B(V', V_S)$ from $Q-^sQ'$.

Figure 10:
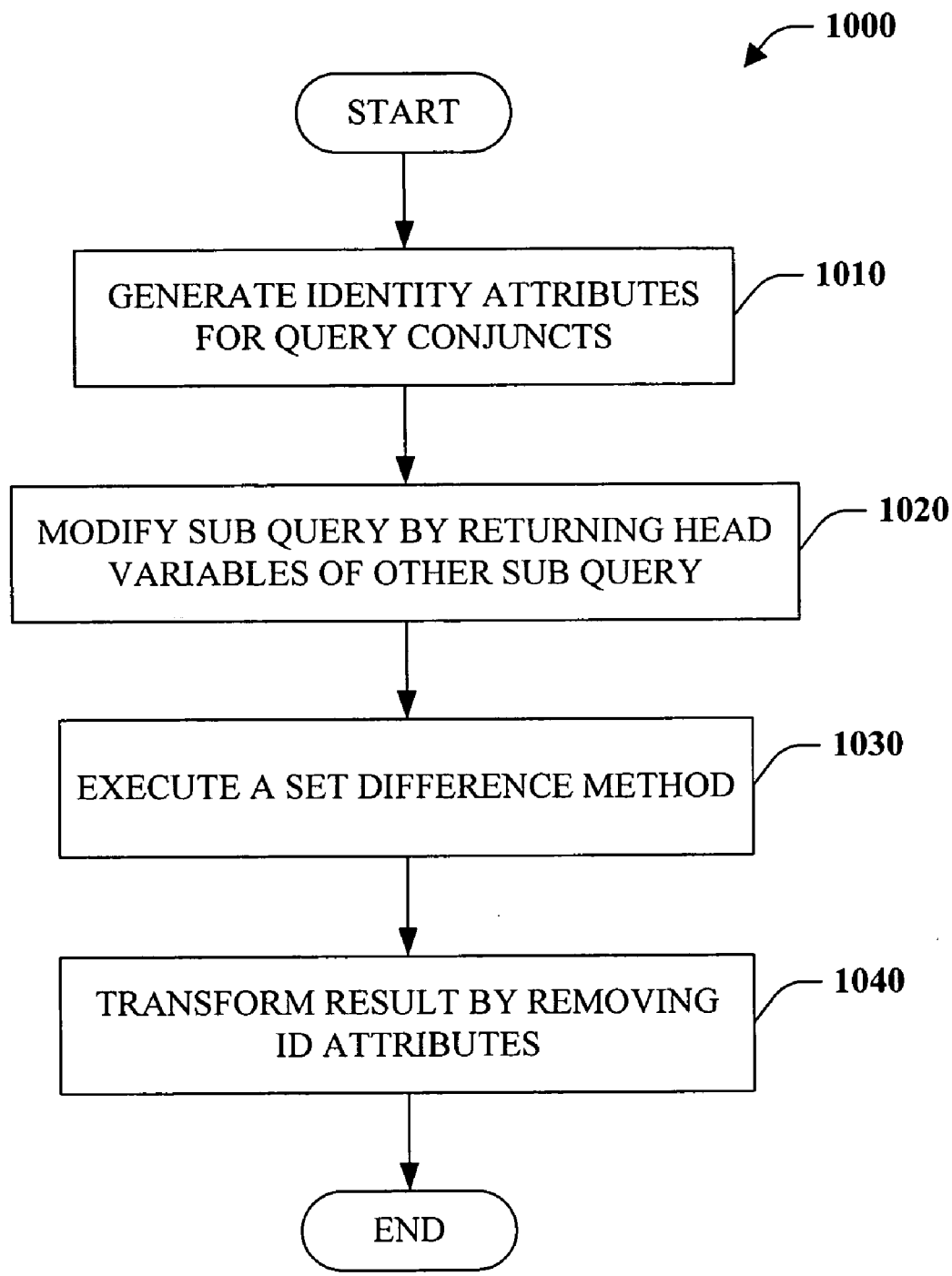
FIG. 10 is a flow chart diagram of a method of generating a bag difference.

FIG. 10 illustrates a method of generating a bag difference $(Q-^bQ')$ in accordance with an aspect of the subject innovation. At reference numeral 1010, attribute identities are generated for query conjuncts. In other words, $Q_{id}$ and $Q'_{id}$ are generated by projection of an id column of each relation to the head of the query. For example:

Q (n, p):–R(n, a, "USA"), S(n, p, cc) becomes $Q_{id}$(rid, sid, n, p):–R(rid, n, a, "USA"), S(sid, n, p, cc)

At numeral 1020, sub query $Q'_{id}$ is modified by only returning the head variables of $Q_{id}$. That is, let $Q''_{id} = \pi_{head(Qid)}(Q'_{id})$. At reference numeral 1030, a set difference method is executed on Q–Q" with each id being a key (e.g., methods 800 and 900 of FIGS. 8 and 9 respectively). At 1040, the results are transformed by removing the id attributes.

Figure 11:
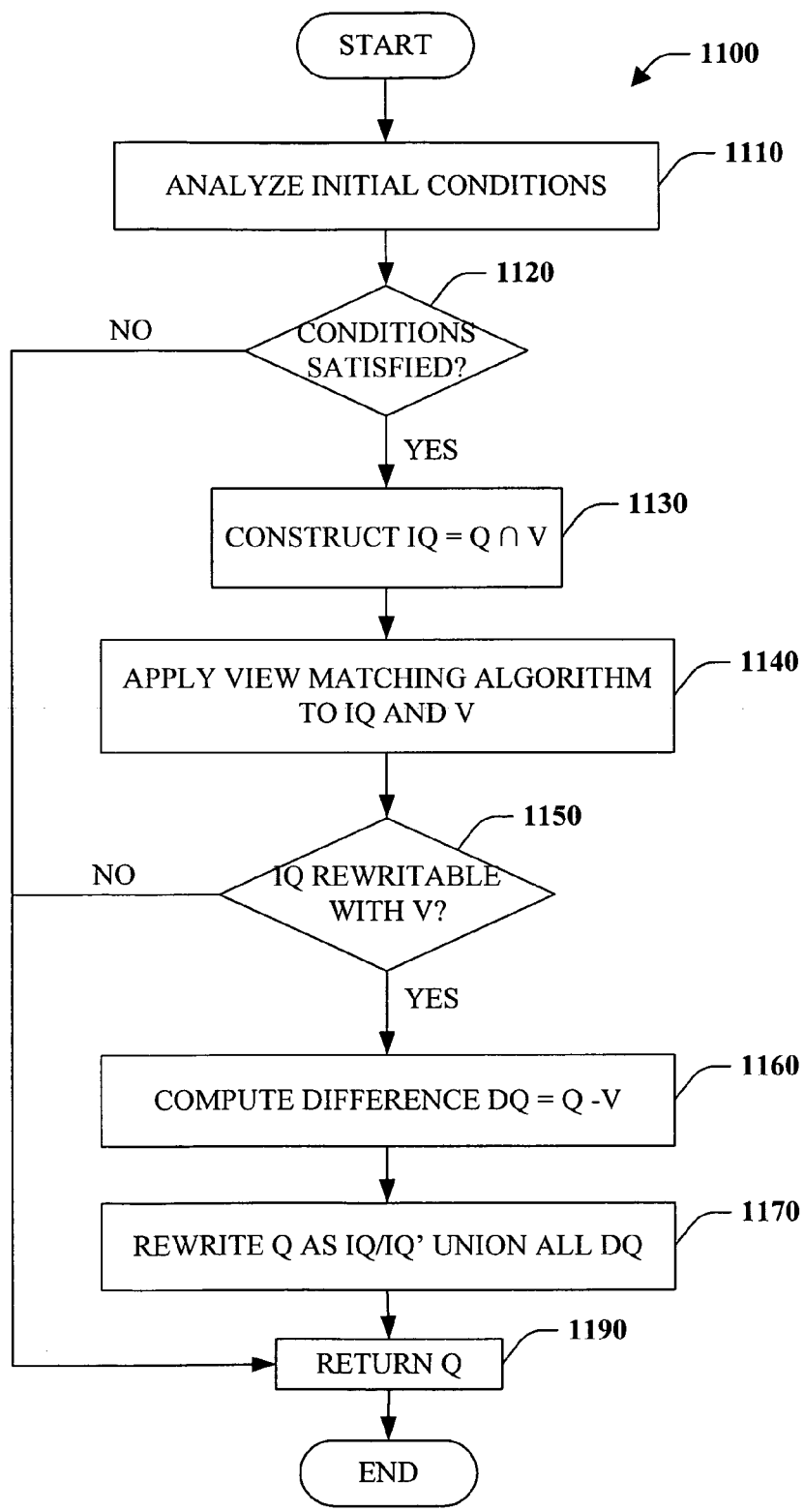
FIG. 11 is a flow chart diagram of a view matching methodology.

FIG. 11 depicts a view matching methodology 1100 in accordance with an aspect of the subject innovation. The methodology can rewrite a query Q using a view V. At reference numeral 1110, initial conditions are analyzed. For example, it can be required that rellist(Q)⊆rellist(V) and head(Q)⊆head(V), and that in V each extra relation is joined with a relation that occurs in Q through equi-join involving its key attributes. At numeral 1120, a determination is made concerning whether the initial conditions are satisfied. If no, the method proceeds to 1190 where the query Q is simply returned. If yes, the method continues at 1130. At reference numeral 1130, an intersection query (IQ) is constructed as the intersection between the query (Q) and the view (V). This can be accomplished by initializing the intersection to be equal to the query an adding all extra relations and predicates in the view to the intersection. At reference numeral 1140, a view matching algorithm is applied to the intersection (IQ) and the view (V). At 1250, a determination is made as to whether the intersection (IQ) can be rewritten using the view (V) to generate a rewriting result (IQ'). If no, then the method proceeds at 1190, where query Q is returned and the method subsequently terminates. If yes, then the method continues at 1160 where the difference query (DQ) is computed as DQ=Q–V. At reference numeral 1170, the query (Q) is rewritten as IQ'UNION ALL DQ. At 1190, the query (Q) is returned and the method 1100 terminates.

Figure 12:
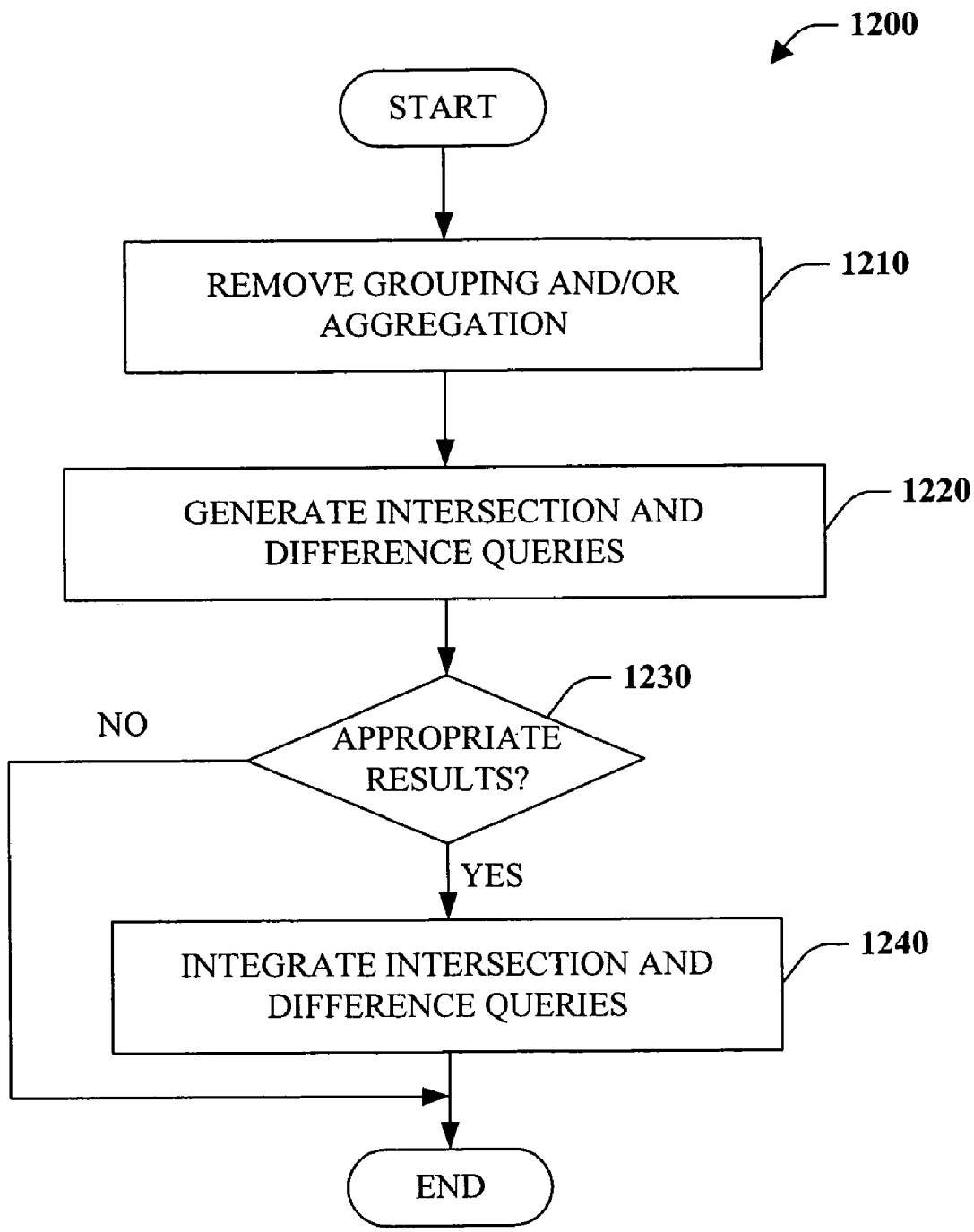
FIG. 12 is a flow chart diagram of an extended view matching methodology.

Referring to FIG. 12, an extended view matching methodology 1200 is depicted in accordance with an aspect of the subject innovation. At reference numeral 1210, grouping and aggregation are removed from a query and view. At 1220, the intersection query and difference query are generated utilizing view matching such as that described above with respect to method 1100 of FIG. 11. At numeral 1230, a check is made to determine if adding back the grouping and/or aggregation will produce an appropriate result. If yes, the method can proceed to 1240 where the intersection and difference query can be integrated to produce a new or modified query. If no, the method will terminate. It should also be appreciated that adding back the grouping and/or aggregation will produce inappropriate or incorrect results then the initial query can be returned upon termination rather than the modified query.

What follows is a brief description of experimental results. Aspects of the subject innovation can be implemented in a classical rule-based query optimizer, although implementation is not limited thereto. Additional operators are not required, the cost of rewriting produced by the disclosed means and mechanisms can be evaluated utilizing existing techniques that today's commercial database servers utilize. For the experiments, the techniques where implemented utilizing a client-side implementation, which naturally forms a component of an interactive data cleaning environment. Such implementation can also be useful in today's setting where the difference computation in the server is potentially expensive.

Two data sets were experimented on, namely a Sales database on a real data warehouse, and the TPCH benchmark. The Sales database is the one based on which we presented the ongoing example. The relation R has about fifty-thousand tuples and S has about two-million tuples. The TPCH database employed was of size 1 GB. The experiments were performed on a Microsoft SQL Server 2005 and ran on an Intel® Pentium® 4 CPU 3.40 GHz, 1 GB RAM machine.

Turning to Table 1, below the naïve and set difference approaches where compared. As is evident, the set difference approach of the subject innovation always performed better than the conventional naïve approaches event under different physical designs.

TABLE 1

| Configuration | Naïve | SetDiff | Speedup |
|---|---|---|---|
| w. indexes, w/o materialized views | 18.68 | 0.33 | 56.61 |
| w/o indexes, w/o materialized views | 14.6 | 2.1 | 6.95 |
| w. indexes, w. materialized Q | 6.8 | 0.29 | 23.45 |
| w. indexes, w. materialized Q, Q' | 1.05 | 0.26 | 3.62 |

Figure 13A:
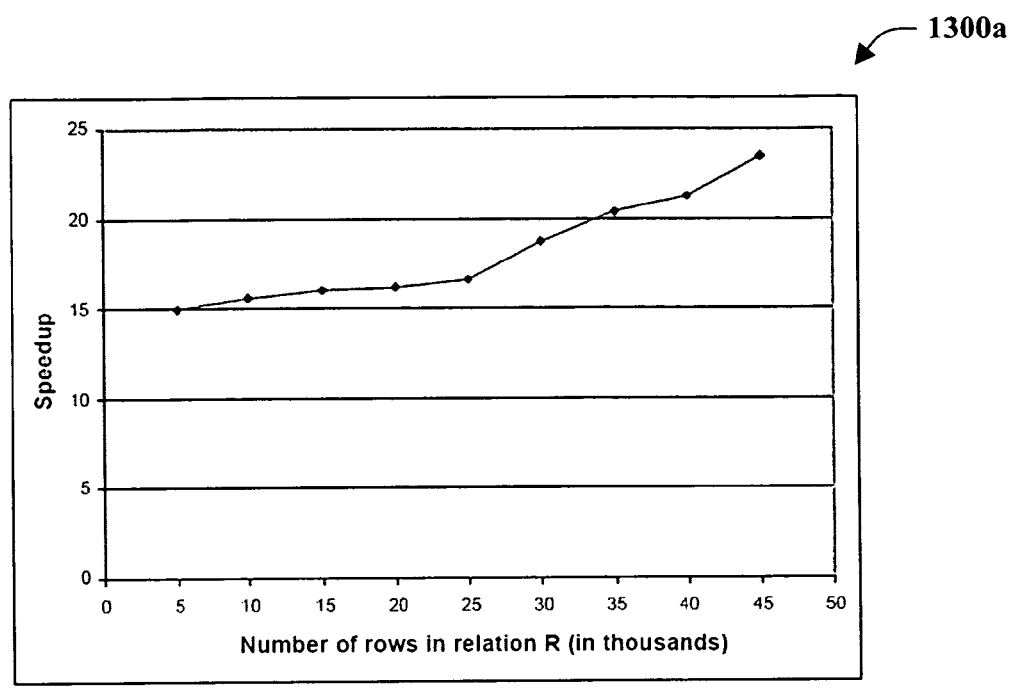
FIGS. 13-16 are charts illustrating experimental results.
Figure 13B:
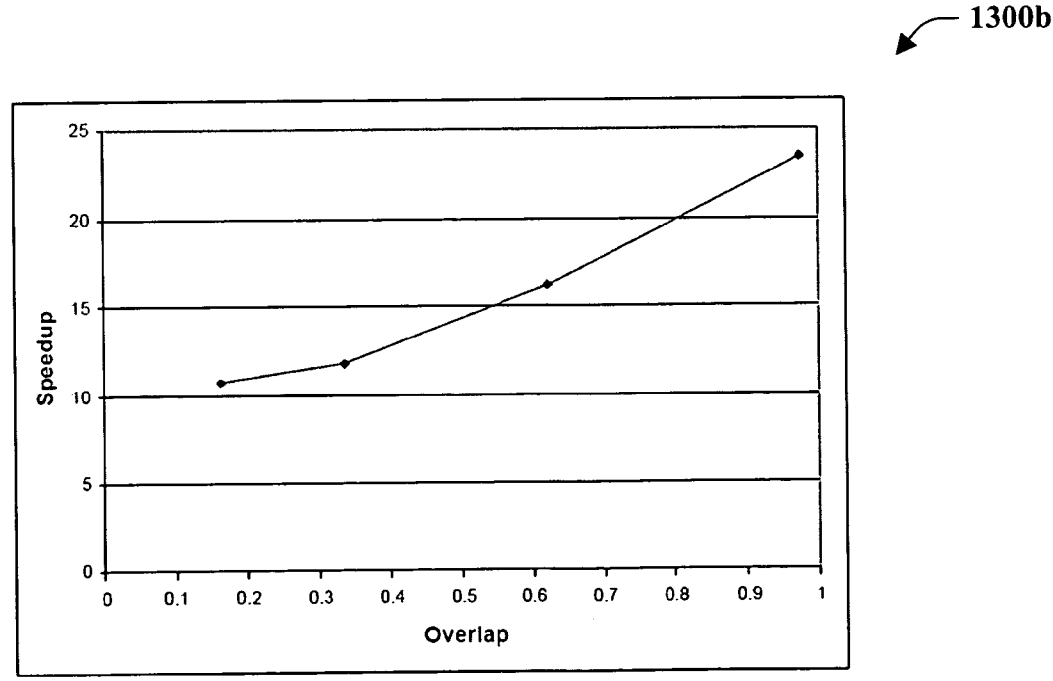

Referring to FIGS. 13a and 13b, charts 1300a and 1300b are illustrated. The experiments were run with the configuration where the result Q is materialized as a view. Chart 1300a illustrates the speedup of set difference over naïve approaches when the size of the relation R varies. In particular, the size of the relation R was varied from 5000 tuples to 50,000 tuples. The chart 1300a shows the results where speedup is plotted against the number of rows in relation R (in thousands). The set difference improved the performance by an order of magnitude. The speedup increased as the input size increased, reaching a factor of 23.45 when the input was of size 50,000.

Chart 1300b shows the relationship between speedup and overlap. The variation between the speed up and the overlap between R and S was studied. As was expected, as the overlap increases, the difference Q–$^s$Q' becomes more selective and the speedup will also increase. The overlap between R and S was varied by adding a range predicate on R and changing the width of the range. As chart 1300b depicts, as the overlap between two queries increased, the speedup increased as well.

Next, the effect of exploiting query difference for view matching was examined. The Sales database was used as described above. The query corresponds to that described above with respect to the view matching section. Further, there was a clustered index on the USAddr.address attribute.

Figure 14:
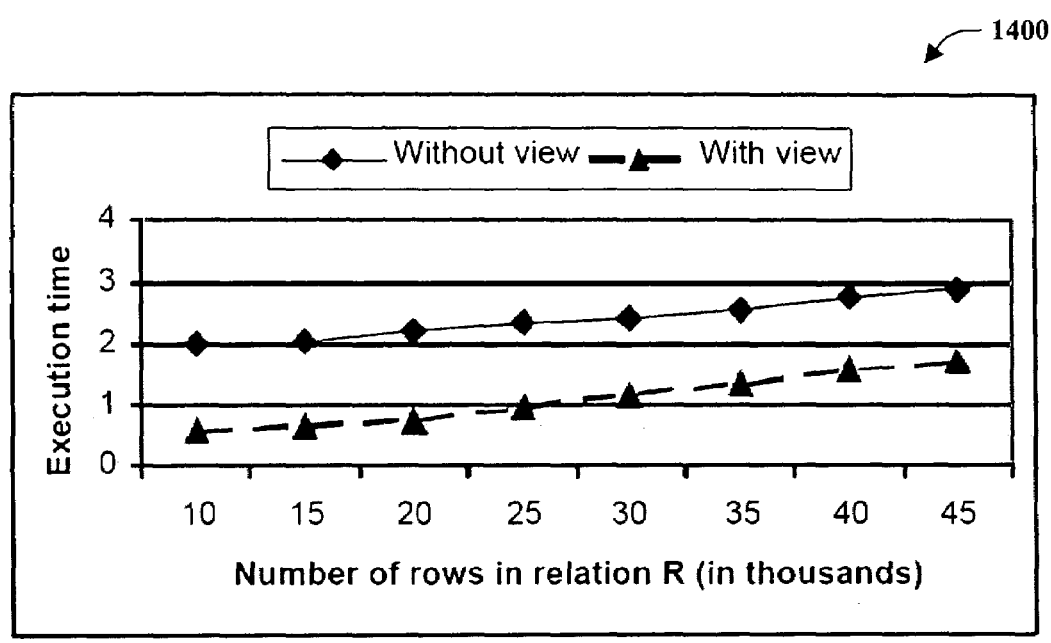

FIG. 14 illustrates a chart 1400 that shows the execution time plotted against the increasing size of the relation R (in thousands of tuples). Conventional technologies cannot answer the query using the view in this case. So, execution of the Q is compared with execution directly without any view. Even though the rewriting generated adds an anti-join, it still substantially improved performance. The speedup in the experiment was up to a factor of three. This happens primarily because first, the anti-join required in the difference query can be efficiently answered in the presence of indexes, and second, the difference between the query and the view is small, so the additional anti-join largely reduced the amount of data to be processed. Furthermore, the improvement yielded is less than for query difference computation itself. This is not surprising since evaluating the intersection query using the view forms a significant fraction of the cost.

Figure 15:
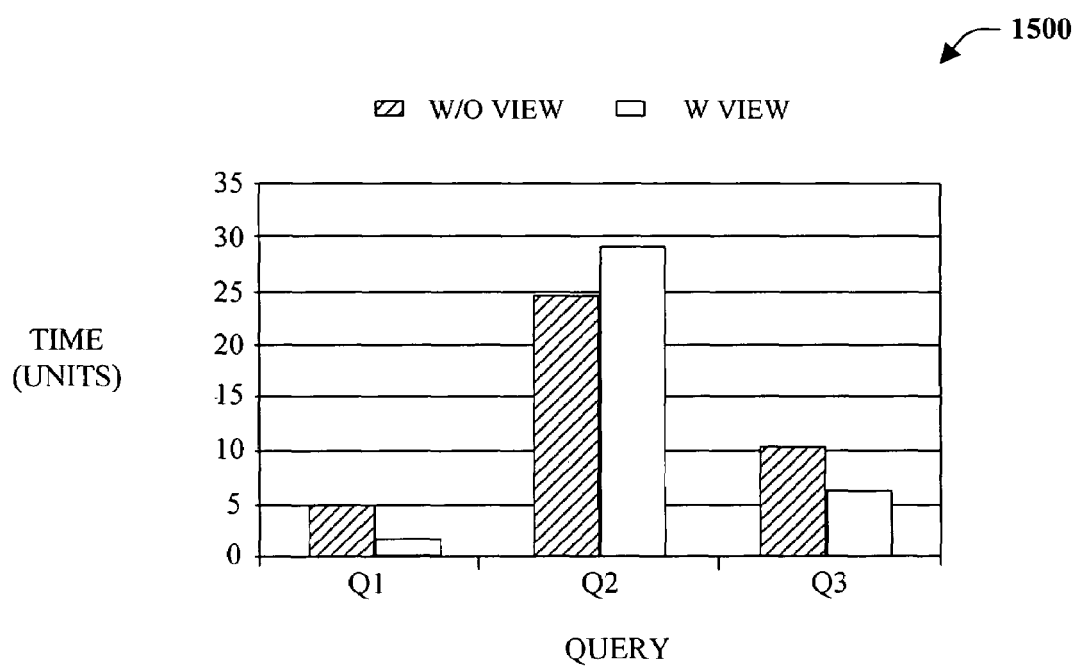

Experiments were also performed on the TPCH benchmark for decision support queries. Three combinations of queries and views were considered: (1) The benchmark query Q1 coupled with a view over a subset of the lineitem table (defined by a predicate on l_shipdate); (2) A join query that joins tables lineitem, partsupp, customer and supplier, coupled with a view that joins lineitem with orders; and (3) A group-by aggregation query that finds, for a subset of customers, the number of lineitems ordered per customer, coupled with a view that performs the same aggregation, but restricted to Japanese customers. Japanese customers where identified by joining the customer table with the nation table. This choice of queries and views is intended to cover a span of queries ranging from simple to complex. FIG. 15 illustrates a chart 1500 that plots the execution time of the queries under two settings: without using the view and using the view, as per the rewriting. Two things were observed. First, for two out of the three cases, there is a substantial improvement using the subject innovation, with a speedup factor of 2.97 for the first query and 1.69 for the third query. This again shows that query difference can be exploited to further the scope of view matching technology. Additionally, it was observed that for one of the queries, using the subject innovation is more expensive because the anti-join introduced turns out to be expensive. Accordingly, the subject innovation can be employed based on a cost-benefit analysis.

Finally, note that the execution time of the rewriting of Q using V is an upper bound of the execution time of the difference query Q–$^b$V. The results imply that the subject innovation with respect to computing query difference, also improves performance for the TPCH dataset.

Figure 16:
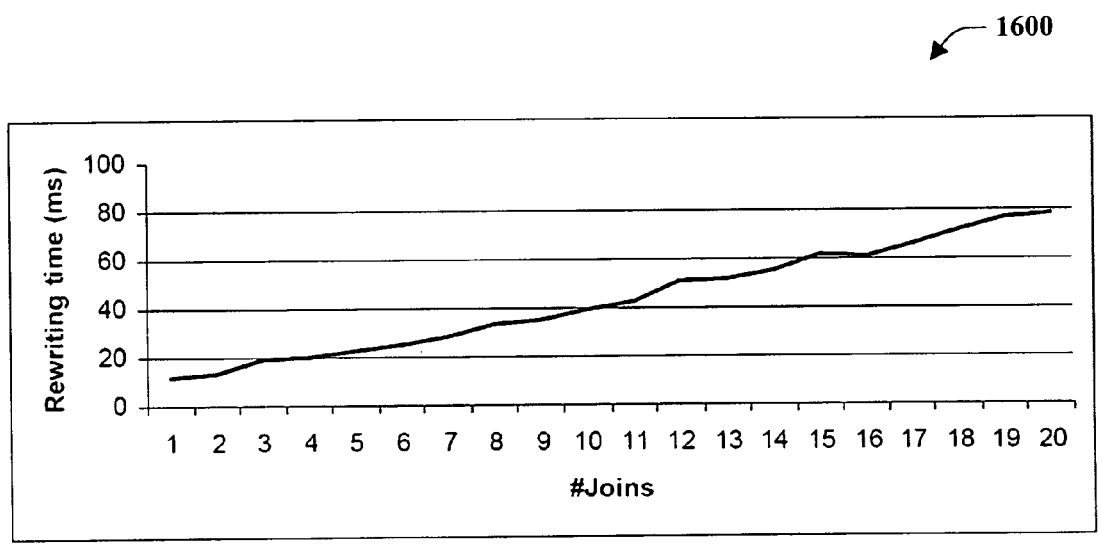

The final experiment examined the rewriting efficiency of the subject query difference algorithm and view matching algorithm. Since the query difference algorithm is called as part of view matching, the efficiency of the view matching is studied, which is an upper bound on the efficiency of the query difference computation. This was studied by generating queries and views with varying number of joins. We fixed a schema of a large number of binary relations in the form of $R_j$ ($A_j$, $A_{j+1}$). Queries and views were generated as the following: for $1 \leq n \leq 20$, a seed relation was randomly selected and a chain-join of length n was generated. For each n, multiple combination of queries and views were generated, each expected to have n joins. The rewriting time was averaged over all these combinations. FIG. 16 provides a chart 1600 that illustrates the results. Even with 20-way joins, the rewriting time hardly exceeds 90 ms. This illustrates that the subject difference query algorithms to perform view matching adds negligible overhead, especially for queries that are expensive to begin with.

Figure 17:
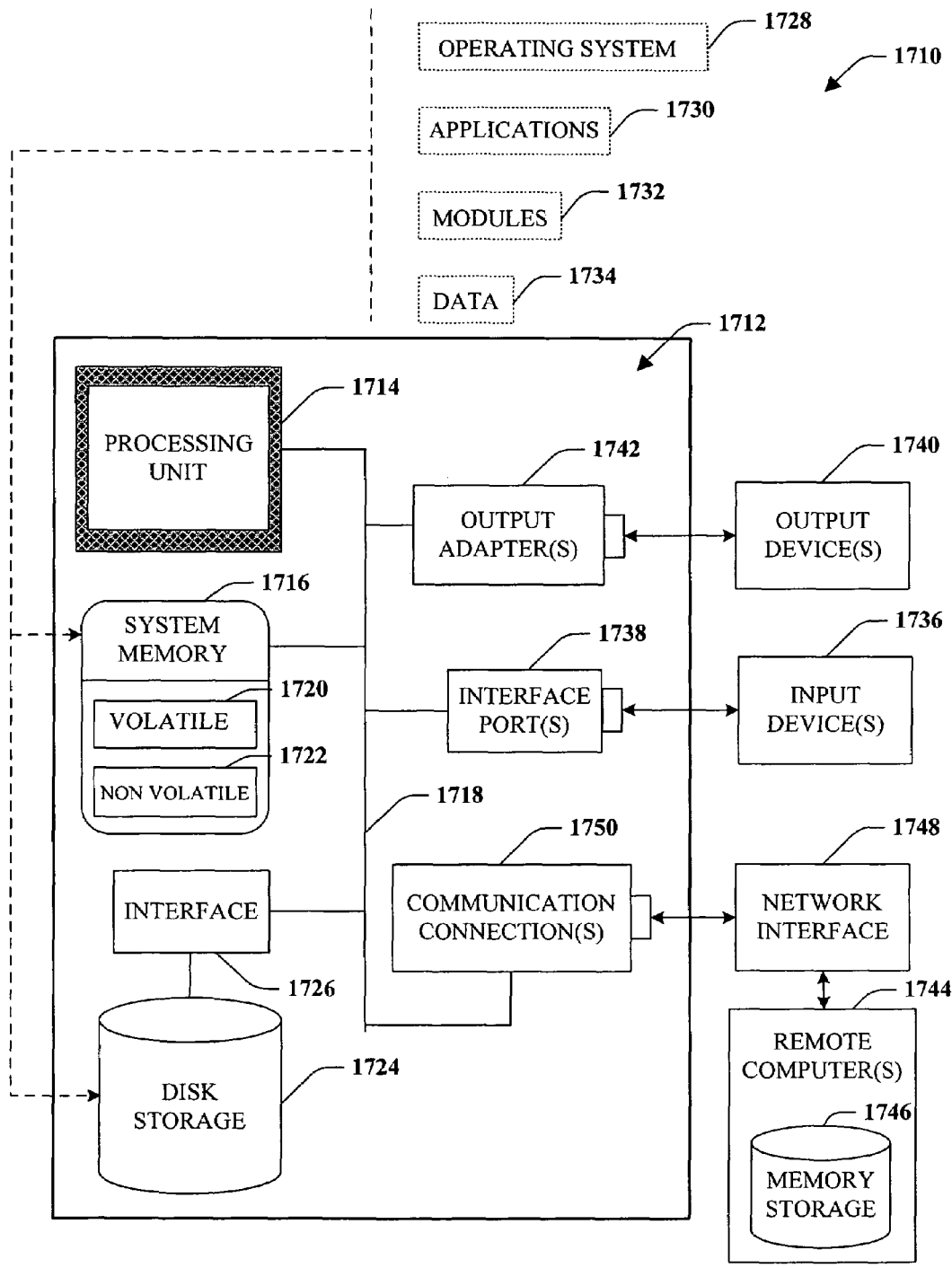
FIG. 17 is a schematic block diagram illustrating a suitable operating environment for aspects of the subject innovation.
Figure 18:
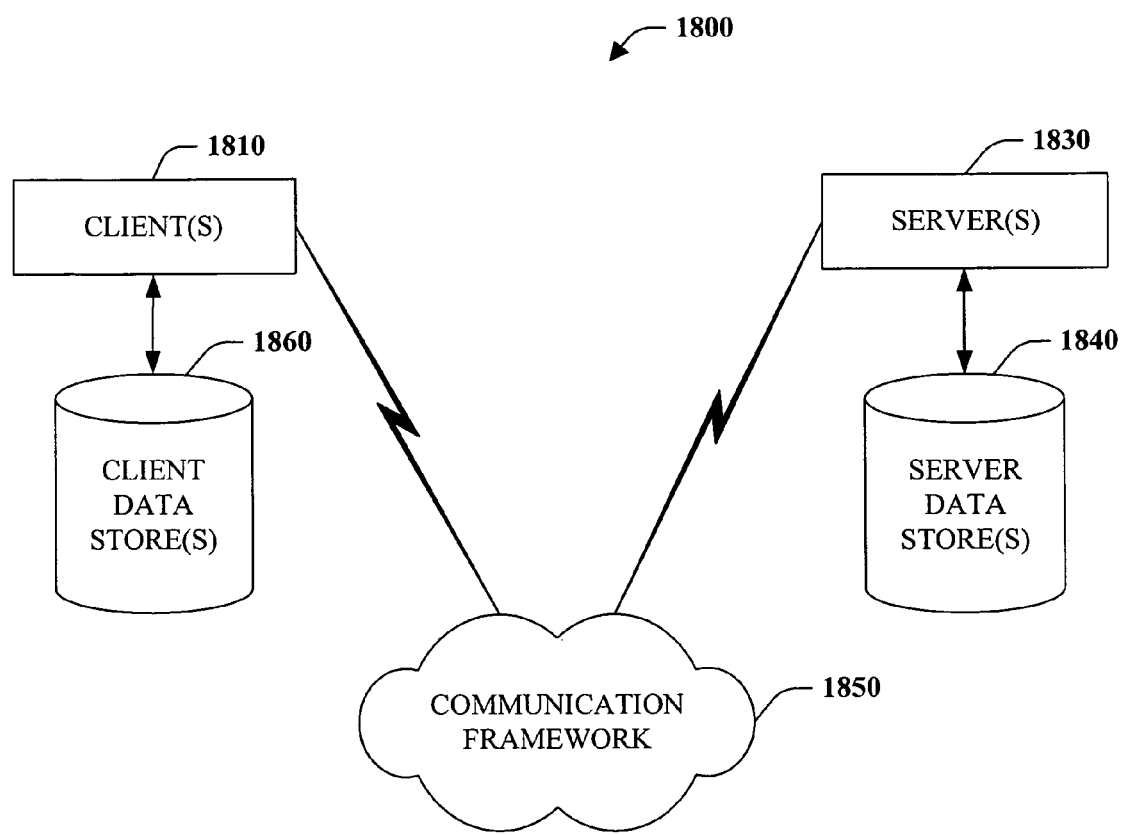
FIG. 18 is a schematic block diagram of a sample-computing environment.

In order to provide a context for the various aspects of the disclosed subject matter, FIGS. 17 and 18 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 17, an exemplary environment 1710 for implementing various aspects disclosed herein includes a computer 1712 (e.g., desktop, laptop, server, hand held, programmable consumer or industrial electronics . . . ). The computer 1712 includes a processing unit 1714, a system memory 1716, and a system bus 1718. The system bus 1718 couples system components including, but not limited to, the system memory 1716 to the processing unit 1714. The processing unit 1714 can be any of various available microprocessors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example, disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712 and to output information from computer 1712 to an output device 1740. Output adapter 1742 is provided to illustrate that there are some output devices 1740 like displays (e.g., flat panel and CRT), speakers, and printers, among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1716, it can also be external to computer 1712. The hardware/software necessary for connection to the network interface 1748 includes, for exemplary purposes only, internal and external technologies such as, modems including regular telephone grade modems, cable modems, power modems and DSL modems, ISDN adapters, and Ethernet cards or components.

FIG. 18 is a schematic block diagram of a sample-computing environment 1800 with which the subject innovation can interact. The system 1800 includes one or more client(s) 1810. The client(s) 1810 can be hardware and/or software (e.g., threads, processes, computing devices). The system 1800 also includes one or more server(s) 1830. Thus, system 1800 can correspond to a two-tier client server model or a multi-tier model (e.g., client, middle tier server, data server), amongst other models. The server(s) 1830 can also be hardware and/or software (e.g., threads, processes, computing devices). The servers 1830 can house threads to perform transformations by employing the subject innovation, for example. One possible communication between a client 1810 and a server 1830 may be in the form of a data packet transmitted between two or more computer processes.

The system 1800 includes a communication framework 1850 that can be employed to facilitate communications between the client(s) 1810 and the server(s) 1830. The client(s) 1810 are operatively connected to one or more client data store(s) 1860 that can be employed to store information local to the client(s) 1810. Similarly, the server(s) 1830 are operatively connected to one or more server data store(s) 1840 that can be employed to store information local to the servers 1830.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A query difference system on comprising the following computer-implemented components:
    a receiver component that receives a first and second query;
    a functional dependency component that modifies the first and second query prior to receipt by the difference component by renaming variables in queries in accordance with functional dependencies, when $V_k$ functionally determines v, then all occurrences of v are renamed using the same variable, and generating new bound variables $V_Q^d \subseteq V_Q^f$, where for each $v \in V_Q^d$, there exists a set of variables $V_K \subseteq V$ that functionally determines v;
    a difference component that generates a minimal difference query based on the first and the second query; and
    at least one of a display device that displays the minimal difference query or a computer readable storage medium that stores the minimal difference query.

2. The query difference system of claim 1, the difference component includes a naïve difference component that generates a naïve representation of the difference between the first and second query.

3. The query difference system of claim 2, the difference component includes a partition component that partitions the naïve representation into a plurality of queries, a union of the plurality of queries is equivalent to the naïve representation.

4. The query difference system of claim 3, the difference component includes an analysis component that analyzes the plurality of queries to identify redundant or contradictory queries to be removed.

5. The query difference system of claim 4, the difference component generates the minimal difference query from the naïve representation and eliminates identified redundant or contradictory queries.

6. The query difference system of claim 1, further comprising an inclusion dependency component that eliminates one or more queries from the minimal difference query based on inclusion dependencies.

7. The query difference system of claim 1, further comprising a transformation component that associates unique identity attributes to data sets to configure bag semantic based minimal difference query generation.

8. The query difference system of claim 1, further comprising:
    an intersection component that generates an intersection query that identifies an intersection between the first and second query; and
    a query writing component that generates a query based on the minimal difference query and the intersection query that efficiently queries a portion of a materialized view and a database, the first query corresponds to a query and the second query corresponds to the materialized view.

9. The query difference system of claim 1, the components form part of at least one of an analytical tool or a query optimizer.

10. A method of determining the difference between two queries comprising the following computer-implemented acts:
    partitioning conjuncts in a naive rewriting of query difference between the two queries; simplifying the query difference by renaming variables in queries in accordance with functional dependencies when $V_k$ functionally determines v, then all occurrences of v are renamed using the same variable, and generating new bound variables $V_Q^d \subseteq V_Q^f$, where for each $v \in V_Q^d$, there exists a set of variables $V_k \subseteq V$ that functionally determines v
    analyzing the conjuncts for redundancy; and
    generating a minimal difference query from the naive rewriting with redundancies removed: and
    at least one of displaying the minimal difference query on a display device or storing the minimal difference query on a computer readable storage medium.

11. The method of claim 10, partitioning comprising:
    dividing each conjuncts into individual partition; and
    merging partitions that share common free variables.

12. The method of claim 11, analyzing conjuncts for redundancy comprises identifying redundant constructs in one or more partitions.

13. The method of claim 10, further comprising removing conjuncts from the minimum difference query based on one or more inclusion dependencies.

14. The method of claim 10, further comprising adding identity attributes to conjunct data sets prior to analyzing and removing the attributes after the minimal difference query is generated.

* * * * *